W. KIESER.
PREVENTING WATER HAMMER IN PIPES.
APPLICATION FILED DEC. 8, 1910.
1,156,532.
Patented Oct. 12, 1915.
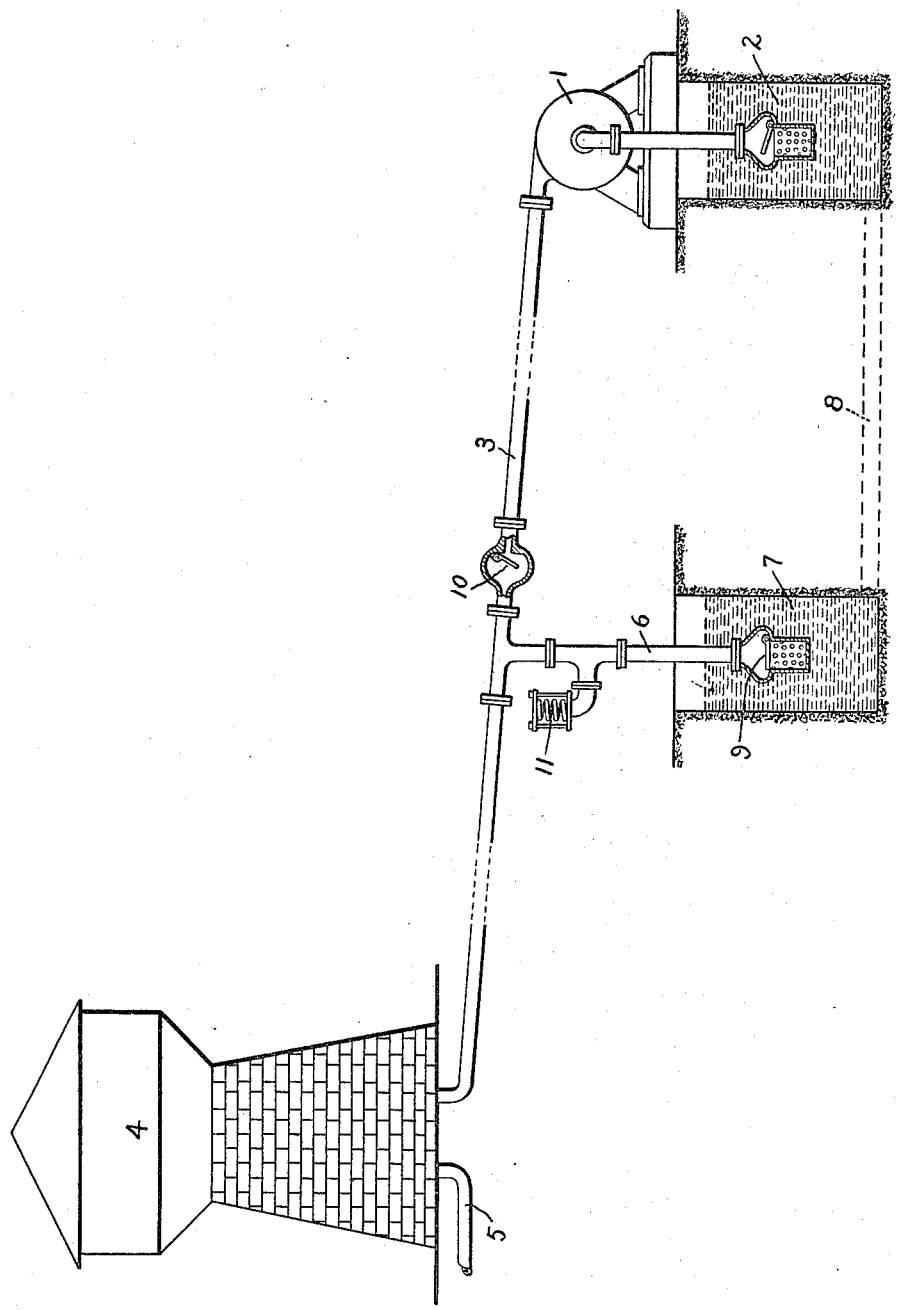
WITNESSES:
J. Earl Ryan.
J. Ellis Elen.
INVENTOR:
WALTER KIESER.
BY
HIS ATTORNEY.

UNITED STATES PATENT OFFICE.

WALTER KIESER, OF BERLIN, GERMANY, ASSIGNOR TO GENERAL ELECTRIC COMPANY, A CORPORATION OF NEW YORK.

PREVENTING WATER-HAMMER IN PIPES.

1,156,532. Specification of Letters Patent. Patented Oct. 12, 1915.

Application filed December 8, 1910. Serial No. 596,203.

*To all whom it may concern:*

Be it known that I, WALTER KIESER, a citizen of Switzerland, residing at Berlin, Germany, have invented certain new and useful Improvements in Preventing Water-Hammer in Pipes, of which the following is a specification.

This invention relates to the transmission of liquids through pipes, and its object is to prevent what is called "water-hammer" when a long column of liquid moving through a pipe is suddenly checked, or when a pump supplying such pipe suddenly ceases to draw. The inertia of the liquid causes it to continue its original course until its inherent momentum is exhausted. This produces a vacuum between the pump and the onward-moving column of liquid, which vacuum gives rise to a violent recoil of the water or other liquid when its forward movement ceases. It has been proposed to overcome this trouble by interposing an air-chamber in the pipe line to hold a supply of water which fills the vacuum when formed. But this scheme is not available when the pipe is long and the quantities of liquid are large or move with great velocity. In such cases the air-chamber must be extremely large and costly and calls for the expenditure of considerable energy to fill it when the pumping begins.

My invention aims to avoid these objections by providing near the pump a branch pipe leading downward from the delivery pipe of the pump and terminating in a reservoir of liquid. In case the pump fails to act, or if for any other cause a vacuum is formed in the delivery pipe, the liquid in the reservoir will be drawn in to fill said vacuum.

The accompanying drawing shows an embodiment of my invention in somewhat diagrammatic manner.

The pump 1 may be of any suitable construction, the one shown being of the centrigugal type driven by any suitable means, not shown. It draws liquid, for instance water, from a cistern 2 and forces it through a long pipe 3 to an elevated tank or standpipe 4, from which the water is distributed through a pipe 5. Quite near the pump is a branch pipe 6 leading downward from the pipe 3 into a reservoir 7, which, if desired, may be connected with the cistern 2 by a conduit 8. A check valve 9 prevents the water delivered by the pump to the pipe 3 from escaping into the reservoir. A check valve 10 in the pipe 3, preferably between the pump and the branch pipe, prevents any backward flow of the water if the pump fails to operate. This valve also keeps the pipe 3 from emptying itself when the pump is disconnected for repairs. A safety valve 11 on the branch pipe 6 insures the pipe 3 against too high a pressure and also furnishes a means for draining said pipe when desired.

What I claim as new and desire to secure by Letters Patent of the United States, is,—

1. The combination with a main pipe, of a pump for forcing liquid therethrough, a branch pipe leading from the main pipe near the pump, a reservoir arranged below the main pipe and to which said branch pipe leads, a check valve in the branch pipe, and a check valve in the main pipe between the branch pipe and the pump.

2. The combination with a pump, of a main delivery pipe through which liquid is forced by the pump, a reservoir arranged below the main pipe, a branch pipe leading downward from the main pipe adjacent the pump to the reservoir, a check valve in the branch pipe that prevents flow from the main pipe into the reservoir, a check valve in the main pipe between the branch pipe and the pump that prevents flow toward the pump, and a relief valve connected to the branch pipe.

3. The combination with a pump having an inlet pipe and discharge pipe, of means for preventing water hammer in said discharge pipe comprising a branch pipe, a reservoir arranged below the discharge pipe into which the branch pipe leads, check valves in the discharge and branch pipes, and a safety valve on the branch pipe.

4. The combination of a main storage reservoir, a pump, a suction pipe therefor, a discharge main connecting the delivery side of the pump to the main storage reservoir, a check valve in the discharge main which prevents flow in the main toward the pump, an auxiliary reservoir, a branch pipe leading from the discharge main to the auxiliary reservoir, and a check valve in said branch pipe which opens toward the discharge main.

In witness whereof, I have hereunto set my hand.

WALTER KIESER.

Witnesses:
  FRANZ SCHOERNER,
  HERMANN HOLLE.